United States Patent [19]

Shirahashi et al.

[11] Patent Number: 5,285,301
[45] Date of Patent: Feb. 8, 1994

[54] LIQUID CRYSTAL DISPLAY DEVICE HAVING PERIPHERAL DUMMY LINES

[75] Inventors: Kazuo Shirahashi; Yuka Matsukawa, both of Mobara; Akira Sasano, Tokyo; Hideaki Taniguchi, Mobara; Hideaki Yamamoto, Tokorozawa; Haruo Matsumaru, Tokyo, all of Japan

[73] Assignee: Hitachi, Ltd., Tokyo, Japan

[21] Appl. No.: 851,925

[22] Filed: Mar. 16, 1992

[30] Foreign Application Priority Data

Mar. 15, 1991 [JP] Japan .................................. 3-051619

[51] Int. Cl.⁵ .............................................. G02F 1/133
[52] U.S. Cl. .............................. 359/59; 359/54; 359/55; 359/87
[58] Field of Search ................ 359/59, 54, 87, 88, 359/57, 67, 55; 340/719, 784

[56] References Cited

U.S. PATENT DOCUMENTS 5,028,122  7/1991  Hamada et al. .................. 359/59
5,132,820  7/1992  Someya et al. .................. 359/54

FOREIGN PATENT DOCUMENTS 1-197722  8/1989  Japan .............................. 359/59

Primary Examiner—William L. Sikes
Assistant Examiner—Huy Mai
Attorney, Agent, or Firm—Antonelli, Terry, Stout & Kraus

[57] ABSTRACT

An active matrix liquid crystal display device with a plurality of thin-film transistors each including a gate electrode, preferably made of an aluminum film formed over a glass substrate, and a gate insulator preferably made of an upper silicon nitride film and a lower anodized oxide film of the aluminum film. Dummy gate lines DGL are disposed outside the outermost scanning signal line GL, and dummy data lines DDL are disposed outside the outermost video signal line DL so as to prevent breakage of outermost signal lines.

22 Claims, 13 Drawing Sheets $y_i$ ⇒

$y_{i+1}$ ⇒

$y_{i+2}$ ⇒

$y_{i+3}$ ⇒

LIQUID CRYSTAL DISPLAY DEVICE HAVING PERIPHERAL DUMMY LINES

BACKGROUND OF THE INVENTION

This invention relates to a liquid crystal display device, particularly a liquid crystal display device of an active matrix type using thin film transistors, or the like.

In a liquid crystal display device of an active matrix type, non-linear devices (switching devices) are disposed in such a manner as to correspond to a plurality of pixel electrodes arranged in matrix, respectively. The liquid crystal in each pixel is always driven, in principle, (a duty ratio of 1.0). In comparison with a so-called "simple matrix type" which employs a time division driving system, therefore, the active matrix system has better contrast and has become an indispensable technique particularly in a color liquid crystal display device. A typical example of the switching devices is a thin film transistor (TFT).

In a conventional active matrix type liquid crystal display device, signals are applied to the outermost scanning signal line and to the outermost video signal line.

The liquid crystal display device of the active matrix type using the thin film transistors is known, for example, from "12.5 Type Active Matrix System Color Liquid Crystal Display Employing Redundancy Structure", Nikkei Electronics, pp. 193-210, Dec. 15, 1986, published by Nikkei-McGraw Hill.

SUMMARY OF THE INVENTION

In such a liquid crystal display device, however, scanning signal lines and video signal lines exist on both sides of each scanning signal line and each video signal line other than the outermost scanning signal line and the outermost video signal line, whereas the scanning signal line and the video signal line exist only on one of the sides of the outermost scanning signal line and the outermost video signal line, respectively. Therefore, formation conditions of a photoresist and etching condition for the outermost scanning signal line and for the outermost video signal line are different from those of other scanning signal lines and video signal lines. Because of these differences and the outermost scanning signal line and video signal line are more likely to break. When an anodic oxide film of aluminum is disposed on a scanning signal line made of aluminum or a material consisting of aluminum as its principal component, as disclosed in U.S. application Ser. No. 07/674,328 which is incorporated by reference herein, the electric field in the outermost scanning signal line portion becomes heterogeneous at the time of anodic oxidization. Furthermore, since the outermost scanning signal line is close to the end portion of a photoresist used for masking of anodic oxidization, dirt is likely to adhere to the outermost scanning signal line when the photoresist is formed. Accordingly, the outermost scanning signal line is sometimes broken when the anodic oxide film is disposed on the scanning signal line.

The present invention was developed in order to solve the problems described above, and is directed to provide a liquid crystal display device wherein the likelihood of breakage of the the outermost signal line is greatly reduced.

In order to accomplish the object described above, in an active matrix type liquid crystal display device using a thin film transistor and a pixel electrode as a constituent element of a pixel, the present invention disposes a dummy line outside the outermost signal line.

In this case, the signal line described above may be a scanning signal line, and an anodic oxide film may be disposed on the scanning signal line.

The signal line described above may be a video signal line.

A dummy pixel may be disposed outside the outermost pixel and the dummy pixel may be masked by a light blocking film.

In this liquid crystal display layer, lines exist on both sides of the outermost signal line in the same way as other signal lines. Therefore, when the signal lines are formed,, the formation condition of a photoresist and the etching condition are the same for the outermost signal line and for other signal lines.

When the signal line is the scanning signal line and the anodic oxide film is disposed on the scanning signal line, the electric field in the outermost scanning signal line portion does not become heterogeneous during anodic oxidation, and dirt does not easily adhere to the outermost signal line during the photoresist formation.

EMBODIMENTS

Figure 1:
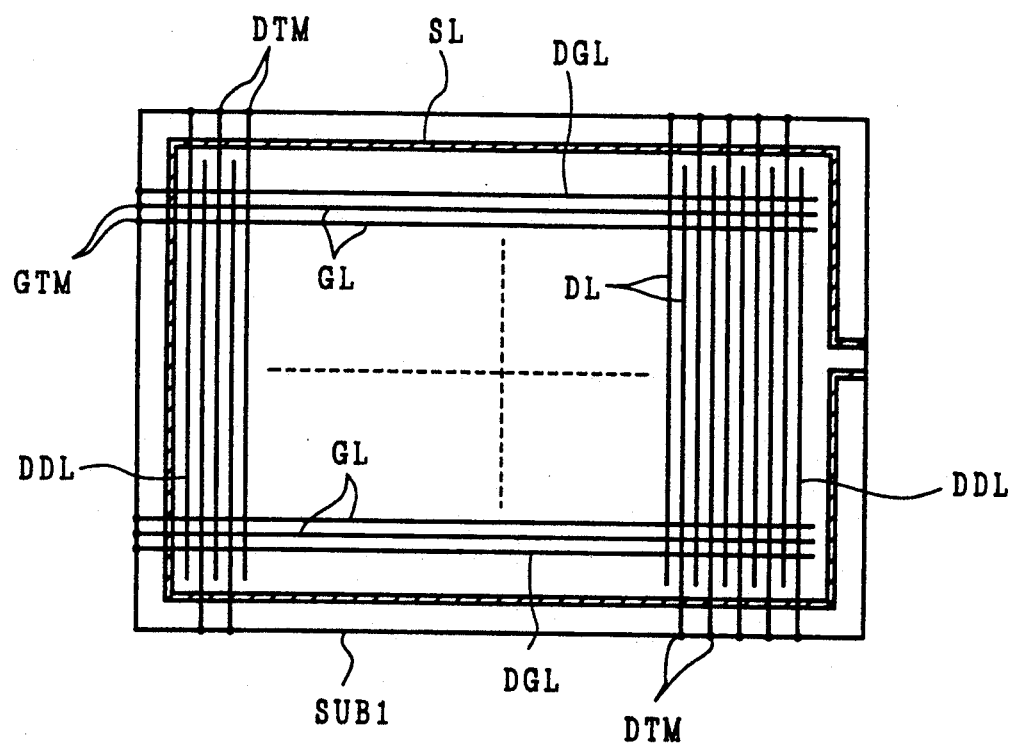
FIG. 1 is a partly schematic sectional view of the liquid crystal display device shown in FIG. 2.

A description will now be provided of a color liquid crystal display circuit of active matrix type, to which the present invention is to be applied.

Incidentally, the parts having identical functions are designated at identical reference characters throughout all the Figures for describing the liquid crystal display circuit, and their repeated descriptions will be omitted.

Figure 2:
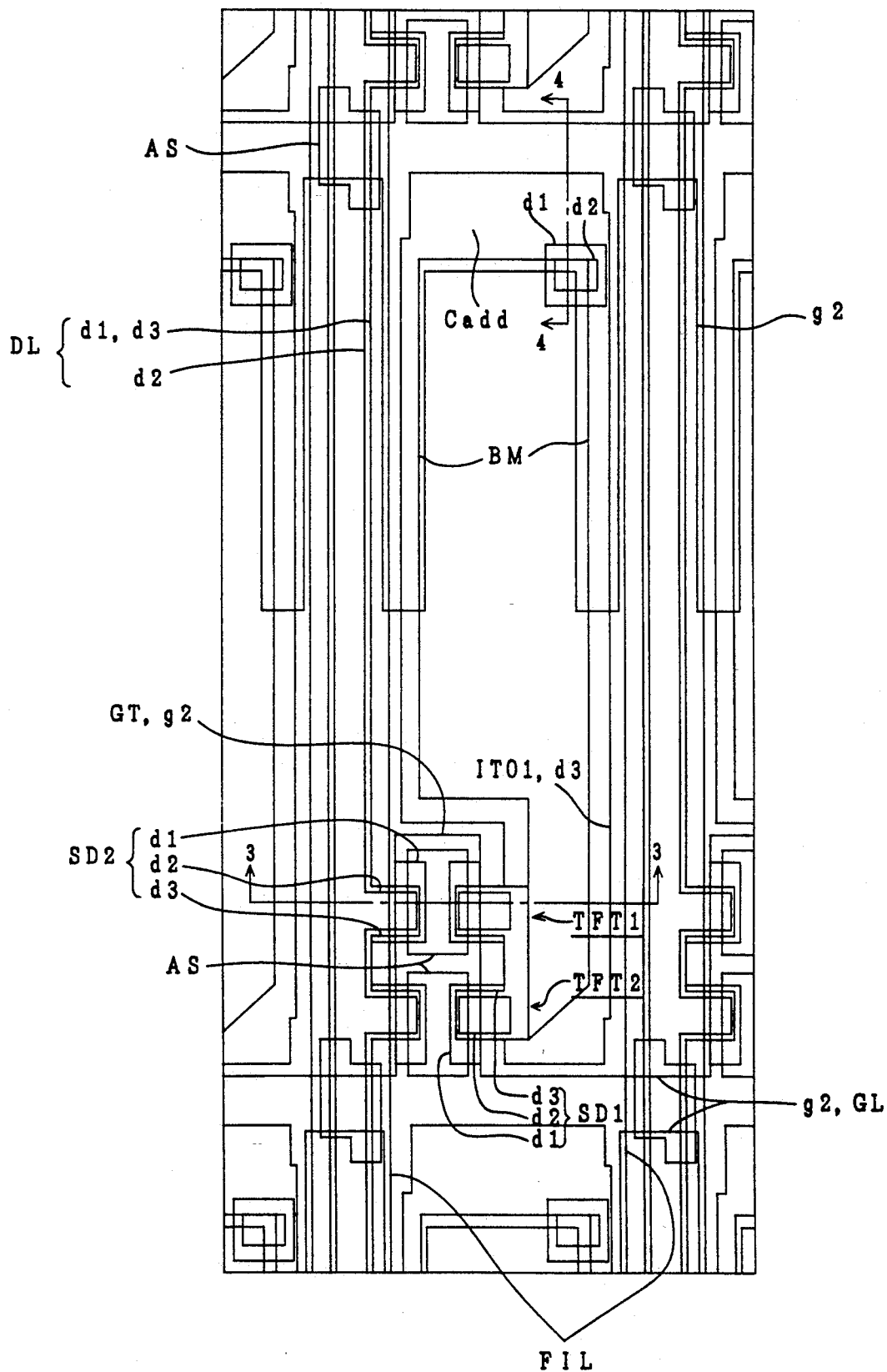
FIG. 2 is a plan view of principal portions and shows one pixel of a liquid crystal display portion of an active matrix type color liquid crystal display device to which the present invention is applied.
Figure 3:
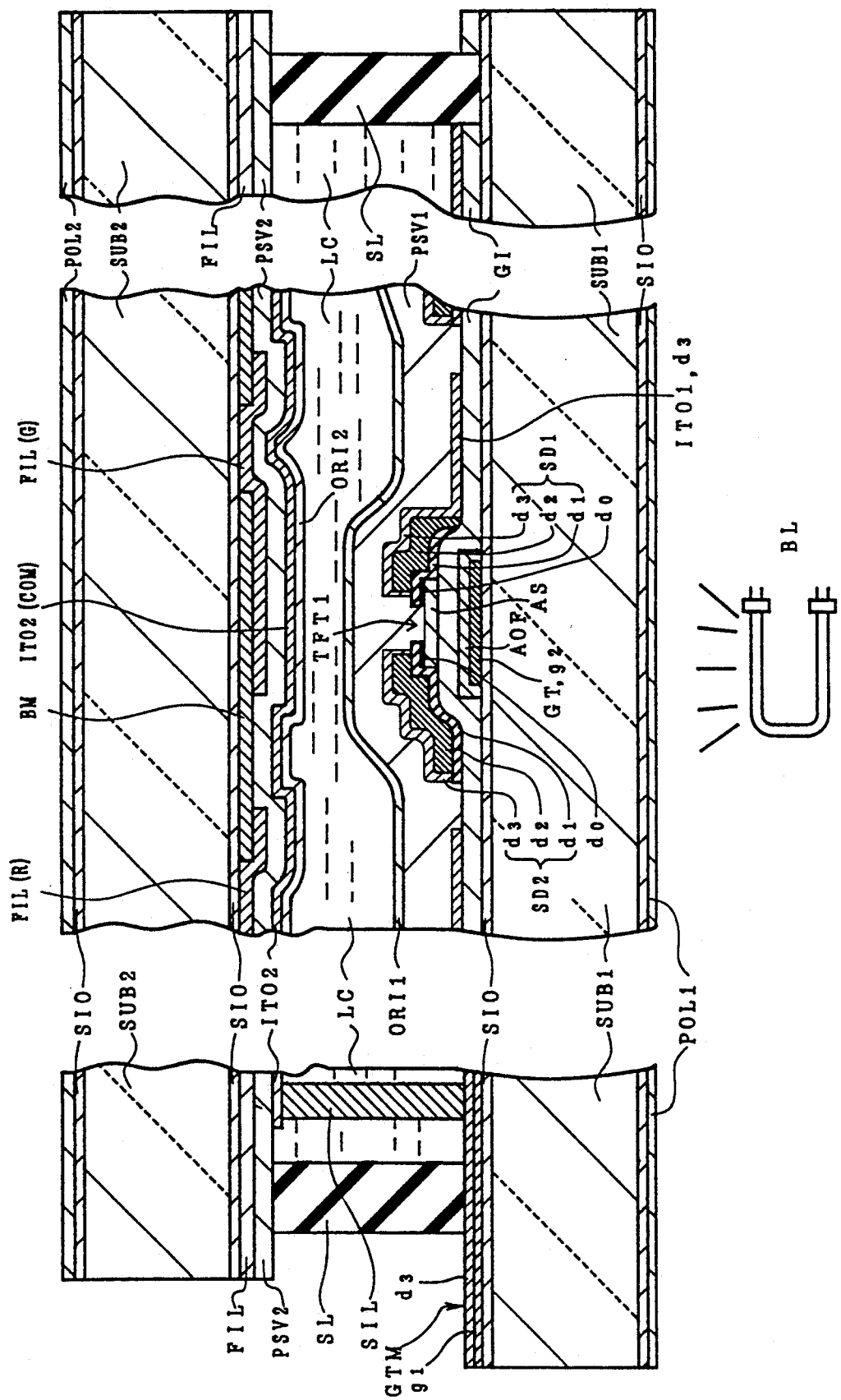
FIG. 3 is a sectional view of the portion taken along a line 3—3 of FIG. 2 and the peripheral portion of a seal portion.
Figure 4:
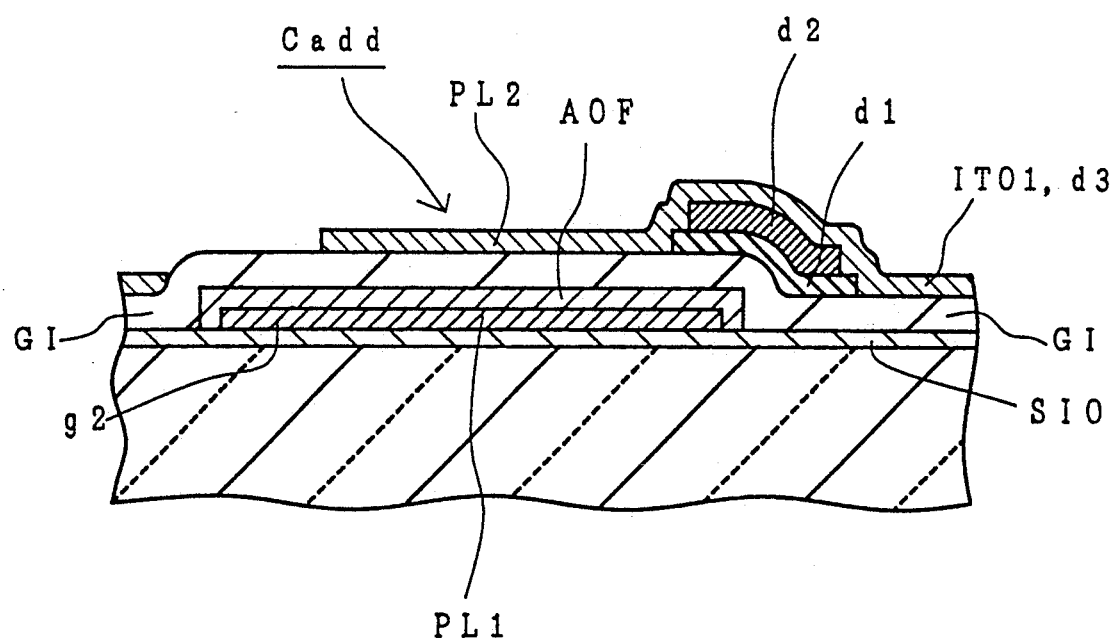
FIG. 4 is a sectional view taken along a line 4—4 of FIG. 2.
Figure 7:
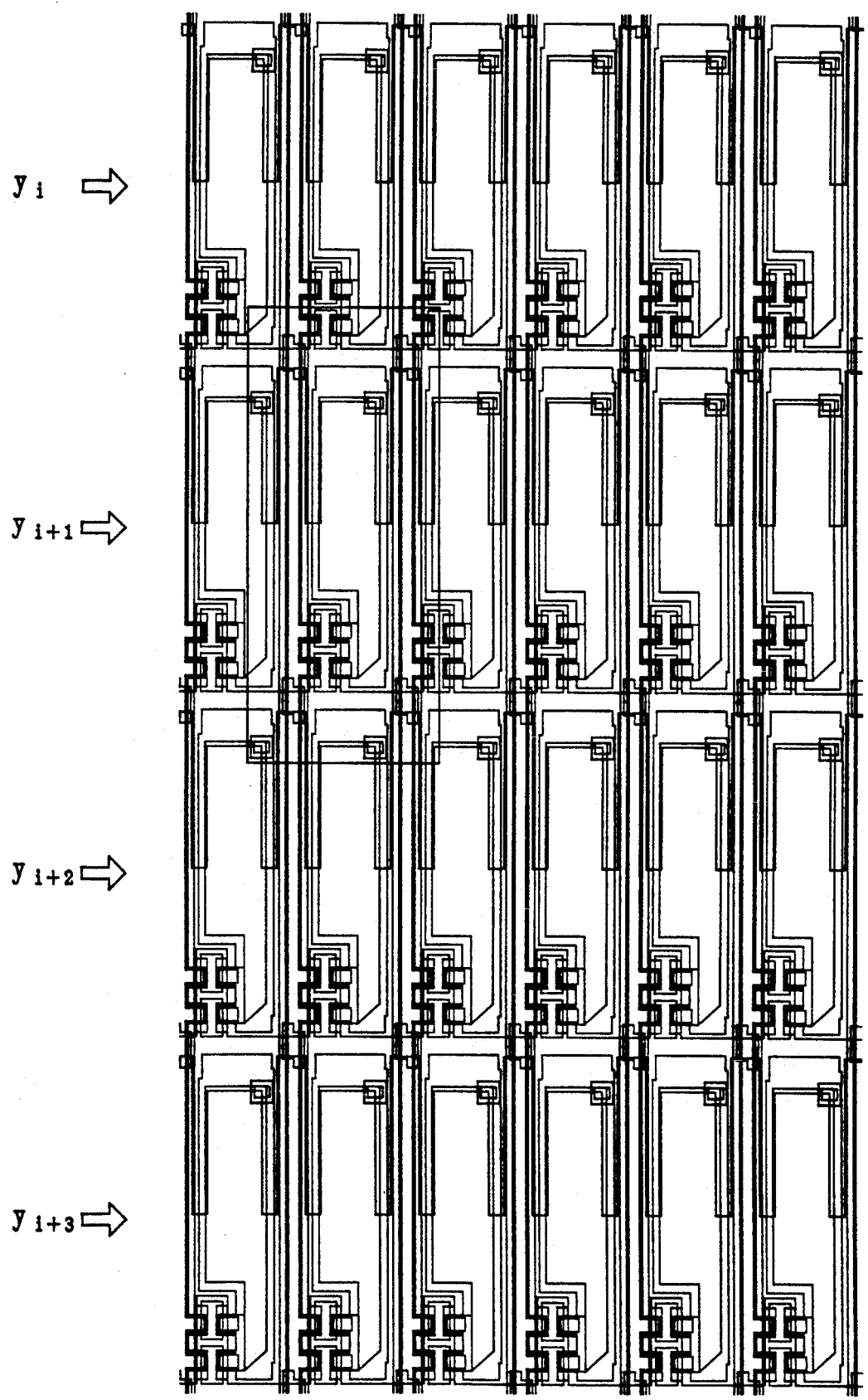
FIG. 7 is a plan view of the principal portions of a liquid crystal display portion obtained by disposing a plurality of pixels shown in FIG. 2.

FIG. 2 is a top plan view showing one embodiment of one pixel and its peripheral portion of the active matrix type color liquid crystal display circuit to which the present invention is to be applied. FIG. 3 is a section taken along line 3—3 of FIG. 2 and shows the embodiment and the vicinity of the sealing portion of the display panel. FIG. 4 is a section taken along 4—4 of FIG. 2 and shows the embodiment. On the other hand, FIG. 7 (showing an essential portion is a top plan view) is a top plan view showing one embodiment in case a number of pixels shown in FIG. 2 are arranged.

Pixel Arrangement

As shown in FIG. 2, each pixel is arranged in a cross region (defined by four signal lines) between two adjacent operation signal lines (e.g., gate signal lines or horizontal signal lines) GL and two video signal lines (e.g., drain signal lines or vertical signal lines) DL. Each pixel includes a thin film transistor TFT, a pixel electrode ITO1 and an additional capacitor Cadd. The scanning signal lines GL are extended in the column direction and arranged in plurality in the row direction. The video signal lines DL are extended in the row direction and arranged in plurality in the column direction.

Overall structure of Panel Section

As shown in FIG. 3, the thin film transistor TFT and the transparent pixel electrode ITO1 are formed at the side of a lower transparent glass substrate SUB1 across a liquid crystal layer LC, and a color filter FIL and a black matrix pattern BM for light shielding are formed at the side of an upper transparent glass substrate SUB2. The side of the lower transparent glass substrate SUB1 is made to have a thickness of about 1.1 (mm), for example.

On the both surfaces of each of transparent glass substrate SUB1 and SUB2 are formed silicon oxide layers SIO deposited by dip treatment. Accordingly, even if there exist sharp defects at the surfaces of the transparent glass substrates SUB1 and SUB2, the scanning signal lines GL as well as the color filter FIL are protected from defects since the defects are covered by the silicon oxide layer SIO.

FIG. 3 presents a section of one pixel portion at its center and a section of the portion, i.e., the lefthand side edges of the transparent glass substrates SUB1 and SUB2, in which the external leading-out wires are present, at its lefthand side. The righthand side presents a section of a portion, i.e., the righthand side edges of the transparent glass substrates SUB1 and SUB2, in which the leading-out wires are absent.

Sealing members SL, as indicated at the lefthand and righthand sides of FIG. 3, are made to seal up the liquid crystal LC and are formed along the whole edges of the transparent glass substrates SUB1 and SUB2 excepting the liquid crystal sealing port (although not shown). The sealing members SL are made of an epoxy resin, for example.

A common transparent pixel electrode ITO2 at the side of the aforementioned upper transparent glass substrate SUB2 has its at least one portion connected with the external leading-out wire, which is formed at the side of the lower transparent glass substrate SUB1, by means of silver paste SIL. This leading-out wire is formed at the fabrication step shared with the aforementioned gate electrode GT, source electrode SD1 and drain electrode SD2.

The individual layers of alignment films ORI1 and ORI2, transparent pixel electrode ITO1, common transparent pixel electrode ITO2, passivation films PSV1 and PSV2 and insulating film GI are formed inside of the sealing member SL. Polarizers POL1 and POL2 are formed on the individual outer surfaces of the lower transparent glass substrate SUB1 and the upper transparent glass substrate SUB2.

A liquid crystal LC is filled between the lower alignment film ORI1 and upper alignment film ORI2 for setting the orientations of the liquid crystal molecules and is sealed with the sealing member SL.

The lower alignment film ORI1 is formed over the passivation film PSV1 at the side of the lower transparent glass substrate SUB1.

On the surface of the inside (at the liquid crystal side) of the upper transparent glass substrate SUB2, there are sequentially laminated a shielding film BM, a color filter FIL, a passivation film PSV2, a common transparent pixel electrode (COM) ITO2 and an upper alignment film ORI2.

This liquid crystal display circuit is assembled by forming the individual layers at the sides of the lower transparent glass substrate SUB1 and the upper transparent glass substrate SUB2, by subsequently superposing the upper and lower transparent glass substrates SUB1 and SUB2, and by filling the liquid crystal LC between the two.

Thin Film Transistor TFT

If a positive bias is applied to the gate electrode GT, the thin film transistor TFT has its channel resistance reduced between its source and drain. If the bias is reduced to zero, the thin film transistor TFT operates to have its channel resistance increased.

The thin film transistor TFT of each pixel is divided into two (or plurality) in the pixel so that it is composed of thin film transistors (or divided thin film transistors) TFT1 and TFT2. These thin film transistors TFT1 and TFT2 are individually made to have a substantially equal size (in the channel length and width). Each of these divided thin film transistors TFT1 and TFT2 is composed mainly of a gate electrode GT, a gate insulating film GI, an i-type (i.e., intrinsic type not doped with a conductivity type determining impurity) amorphous Si semiconductor layer AS, and a pair of source electrode SD1 and drain electrode SD2. Incidentally, the source and drain are intrinsically determined in dependence upon the bias polarity inbetween, and this polarity is inverted during the operation in the circuit of the present display circuit. Thus, it should be understood that the source and drain are interchanged during the operation. In the following description, however, one is fixed as the source whereas the other is fixed as the drain, for conveniences only.

Gate Electrode GT

Figure 8:
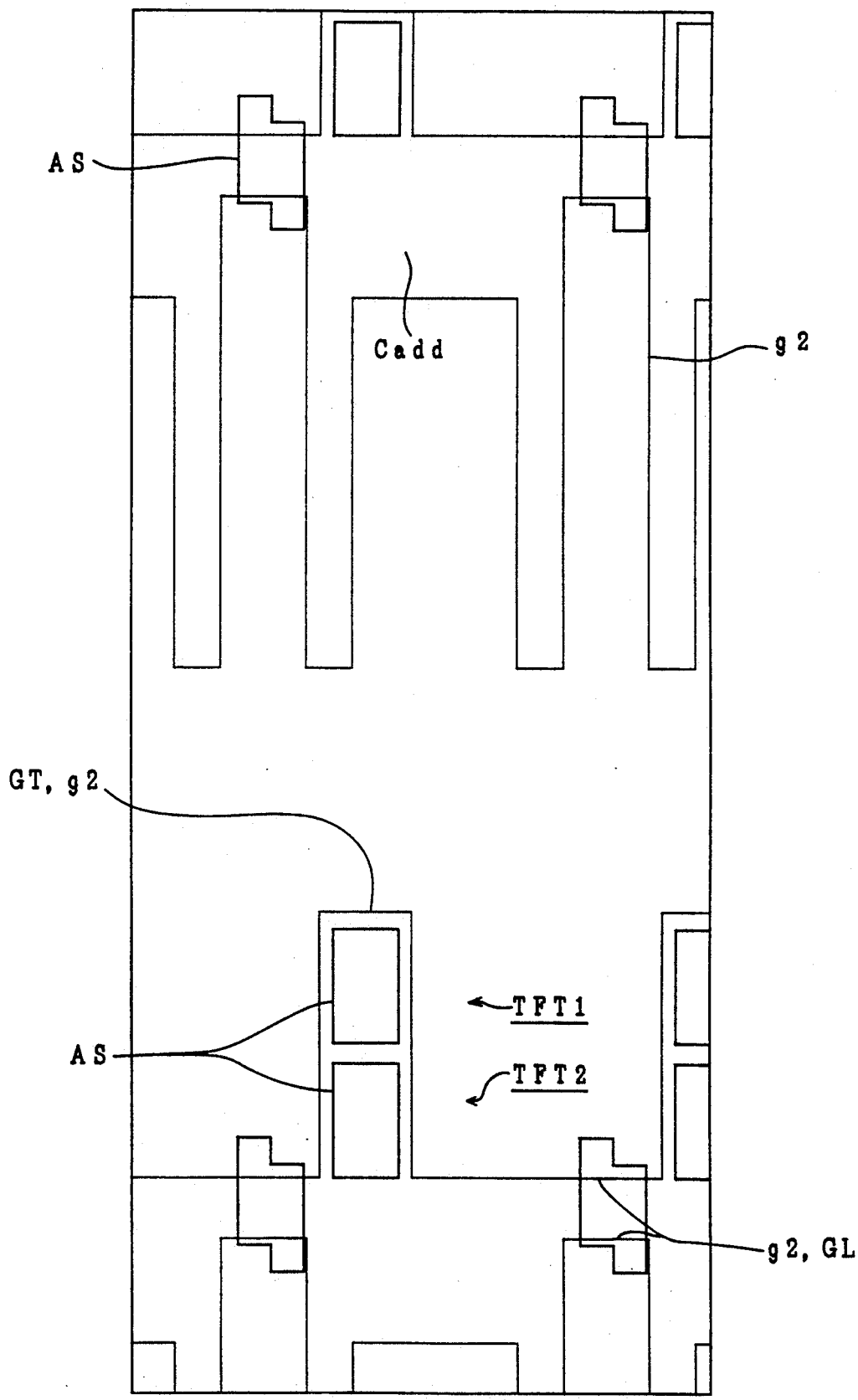
FIG. 8 is a plan view depicting only a predetermined layer of the pixel shown in FIG. 2.

The gate electrode GT is formed to project perpendicularly (i.e., upward, as viewed in FIGS. 2 and 8)

from the scanning signal lines GL (or branched in the "T-shape"), as shown in detail in FIG. 8 (presenting a top plan view showing the second conductive layer g2 and i-type semiconductor layer AS of FIG. 2 only). The gate electrode GT is extended to the regions to be individually formed with the thin film transistors TFT1 and TFT2. These thin film transistors TFT1 and TFT2 have their individual gate electrodes GT integrated (as their common gate electrode) to merge into the scanning signal line GL. The gate electrode GT is constituted by the second single level conductive layer g2. The conductive layer g2 is formed by, for example, by sputtering aluminum in the thickness of about 1,000 to 5,500 angstroms. On the gate electrode GT an anodized oxide film of aluminum AOF is provided.

This gate electrode GT is made so slightly large as to cover the semiconductor layer AS completely (as viewed upward), as shown in FIGS. 2 and 3 and FIG. 8. In case, therefore, a back light BL such as a fluorescent lamp is attached to the bottom of the substrate SUb1, this opaque aluminum gate electrode GT establishes a shadow to shield the semiconductor layer AS from the back light, thus substantially eliminating the conducting phenomenon due to the optical irradiation, i.e., the deterioration of the OF characteristics of the TFTS. Here, the intrinsic size of the gate electrode GT is (given the least necessary width (including the positioning allowance of the gate electrode GT of the source/drain electrodes SD1 and SD2) for extending between the source/drain electrodes SD1 and SD2. The depth for determining that channel width W is determined in dependence upon the factor W/L determining the mutual conductance gm, i.e., the ratio to the distance (i.e., the channel length) L between the source/drain electrodes SD1 and SD2.

The size of the gate electrode in the present embodiment is naturally made larger than the aforementioned intrinsic size.

Scanning Signal Line GL

The aforementioned scanning signal line GL is constituted by the second-level conductive film g2. The second-level conductive film g2 of the scanning signal line GL is formed at the same step and integrally with the second-level conductive film g2 of the aforementioned gate electrode GT. On the scanning signal lines GL there is provided an anodized oxide film of aluminum AOF.

Dummy lines DGL, DDL

As shown in FIG. 1, a dummy line DGL is disposed outside the outermost scanning signal line GL, and a dummy line DDL is disposed outside the outermost video signal line DL.

Since the dummy lines DGL and DDL are disposed outside the outermost scanning signal line GL and video signal line DL, respectively, as described above, lines GL, DGL and lines DL, DDL exist on both sides of these outermost scanning signal line GL and video signal line DL in the same way as other scanning signal line GL and video signal line DL. For this reason, the formation condition of the photoresist and the etching condition become the same for the outermost scanning signal line GL and video signal line GL and for other scanning signal line DL and video signal line DL when the scanning signal line GL and the video signal line DL are formed, so that the outermost scanning signal line GL and video signal line DL are not broken. The electric field in the outermost scanning signal line GL does not become heterogeneous during anodic oxidation for disposing the anodic oxide film AOF on the scanning signal line GL, and dirt does not easily adhere to the outermost scanning signal line GL when the photoresist used for masking anodic oxidation. Therefore, the outermost scanning signal line GL is not broken when the anodic oxide film AOF is disposed on the scanning signal line GL.

Incidentally, the dummy lines are sometimes broken when the anodic oxide film AOF is disposed on the scanning signal line GL to form the scanning signal line GL and the video signal line DL. Even when the dummy lines DGL, DDL are broken, however, the breakage does not affect display quality of the liquid crystal display device. The dummy lines DGL, DDL are masked by a panel frame or by a light blocking film BM.

Gate Insulating Film GI

The insulating film GI is used as the individual gate insulating films of the thin film transistors TFT1 and TFT2. The insulating film GI is formed over the gate electrode GT and the scanning signal line GL. The insulating film GI is formed of a silicon nitride film prepared by the plasma CVD, for example, to have a thickness of about 3,000 angstroms.

i-Type Semiconductor Layer AS

The i-type semiconductor layer AS is used as the individual channel forming regions of the thin film transistors TFT1 and TFT2 divided into a plurality of parts, as shown in FIG. 8. The i-type semiconductor layer AS is formed of an amorphous silicon film or polycrystalline silicon film to have a thickness of about 1,800 angstroms.

This i-type semiconductor layer AS is formed subsequent to the formation of the $Si_3N_4$ gate insulating film GI by changing the components of supply gases but by using the common plasma CVD system such that it is not exposed from the system to the outside. On the other hand, an $N^+$- type layer dO (shown in FIG. 3) doped with P for the ohmic contact is likewise formed subsequently to have a thickness of about 400 angstroms. After this, the lower substrate SUB1 is taken out of the CVD system, and the $N^+$-type layer dO and the i-type AS are patterned into independent islands by the photographic technology, as shown in FIGS. 2 and 3 and FIG. 8.

The i-type semiconductor layer AS is also formed between the intersecting portions (or crossover portions) of the scanning signal line GL and the video signal line DL, as shown in detail in FIG. 2 and FIG. 8. This cross over i-type semiconductor layer AS is formed to reduce the short-circuiting between the scanning signal line GL and the video signal line DL at the intersecting portion.

Source/Drain Electrodes SD1 and SD2

Figure 9:
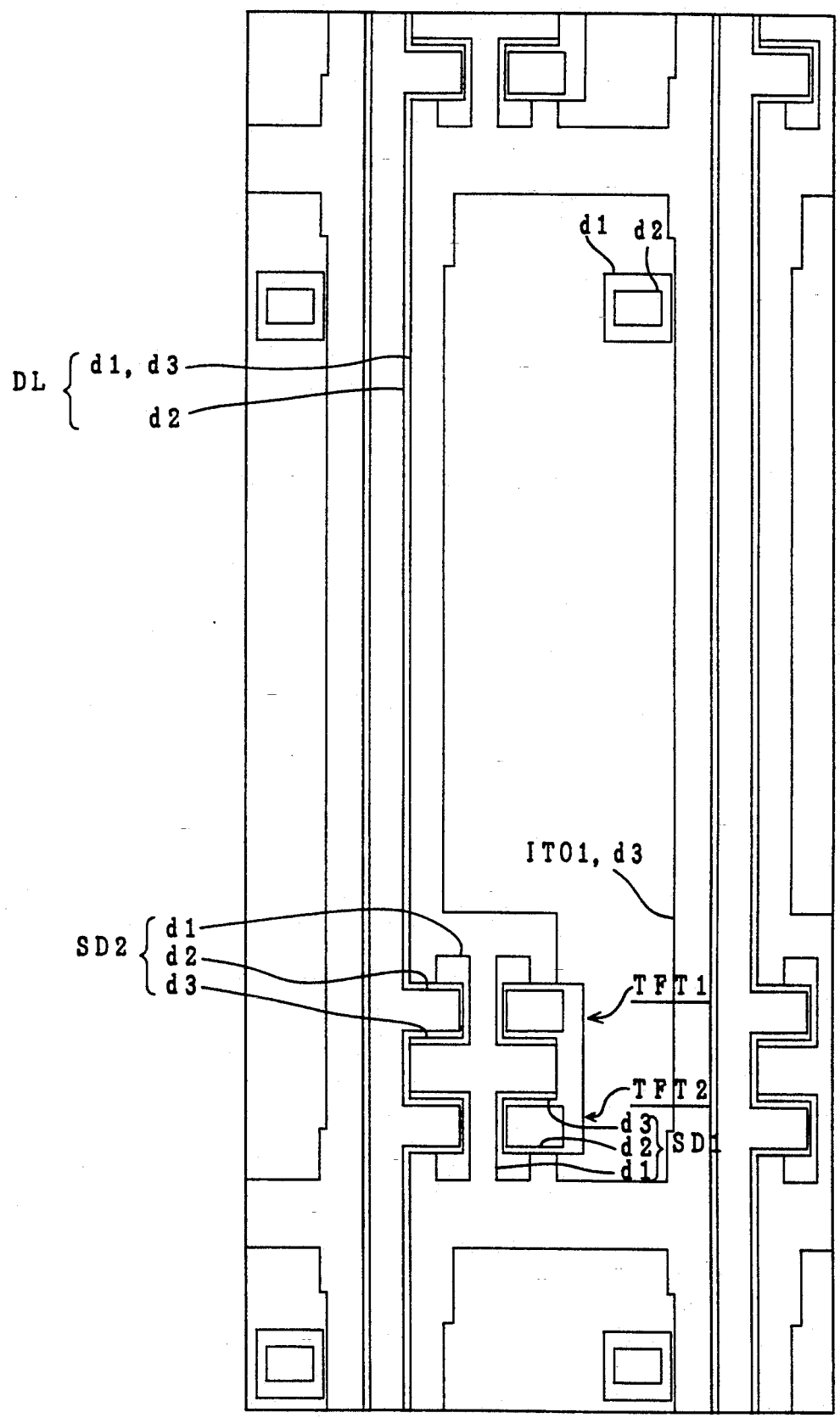
FIG. 9 is a plan view depicting only a predetermined layer of the pixel shown in FIG. 2.

The individual source electrodes SD1 and drain electrodes SD2 of the divided thin film transistors TFT1 and TFT2 are formed over the semiconductor layer AS and separately from each other, as shown in detail in FIGS. 2 and 3 and in FIG. 9 (presenting a top plan view showing the first through third conductive layers d1 to d3 of FIG. 2 only).

Each of the source electrode SD1 and the drain electrode SD2 is formed by overlaying a first conductive film d1, a second conductive film d2 and a third conductive film d3 sequentially from the lower side contacting with the N+-type semiconductor layer dO. These first conductive film d1, second conductive film d2 and third conductive film d3 of the source electrode SD1 are formed at the same fabrication step as those of the drain electrode SD2.

The first conductive film d1 is formed of a sputtered chromium film to have a thickness of 500 to 1,000 angstroms [e.g., about 600 angstroms in the present embodiment]. The chromium film is formed to have a thickness no more than 2,000 angstroms because it establishes a high stress if it is made excessively thick. The chromium film has an excellent contact with the N -type semiconductor layer dO. The chromium film forms a barrier to prevent the diffusion of aluminum from a second conductive film d2 (described later) into the N+-type semiconductor layer dO. The first conductive film d1 may be made of not only the aforementioned chromium film but also a refractory metal (e.g., Mo, Ti, Ta or W) film or its silicide (e.g., MOSi$_2$, TiSi$_2$, TaSi$_2$ or WSi$_2$.).

After the first conductive film d1 has been patterned with the photography, the N+-type layer dO is removed by using the same photographic mask or the first conductive film d1. Specifically, the N+-type layer dO left on the i-th layer AS is removed in self-alignment while leaving the first conductive film d1 as it is. Since, at this time, the N+-type layer dO is etched to remove its whole thickness, the i-th layer AS is slightly etched off at its surface portion, but this removal may be controlled by the etching period.

After this, the second conductive film d2 is formed of sputtered aluminum to have a thickness of 3,000 to 5,500 angstroms (e.g., about 3,500 angstroms in the present embodiment). The aluminum layer is less stressed than the chromium layer so that it can be formed to have larger thickness thereby to reduce the resistances of the source electrode SD1, the drain electrode SD2 and the video signal line DL. The second conductive film d2 may be formed of not only the aluminum film but also an aluminum film containing silicon (Si) or copper (Cu) as an additive.

After the second conductive film d2 has been patterned by the photographic technology, the third conductive film d3 is formed. This third conductive film d3 is formed of a sputtered transparent conductive film (e.g., ITO, i.e., Indium-Tin-Oxide: NESA film) to have a thickness of 1,000 to 2,000 angstroms (about 1,200 angstroms in the present embodiment). This third conductive film d3 constitutes not only the source electrode SD1, the drain electrode SD2 and the video signal line DL but also the transparent pixel electrode ITO1.

Each of the first conductive film d1 of the sources electrode SD1 and the first conductive film d1 of the drain electrode SD2 is internally (i.e., into the channel region) turned more deeply than the upper lying second conductive film d2 and third conductive film d3. In other words, the first conductive films d1 in those portions is enabled to regulate (or define) the channel length L of the thin film transistor TFT independently of the layers d2 and d3.

The source electrode SD1 is connected with the transparent pixel electrode ITO1. The source electrode SD1 is formed along the stepped shape (i.e., the step corresponding to the sum of the thicknesses of the first conductive film d1, the N+-type layer dO and the i-type semiconductor layer AS) of the i-type semiconductor layer AS.

More specifically, the source electrode SD1 is composed of: the first conductive film d1 formed along the stepped shape of the i-type semiconductor layer AS, the second conductive film d2 formed over the first conductive film d1 but sized smaller than the first conductive film d1 at its side to be connected with the transparent pixel electrode ITO1, and the third conductive film d3 connected with the portion of the first conductive film d1 exposed to the outside from the second conductive film d2.

This second conductive film d2 of the source electrode SD1 is formed to ride over the i-type semiconductor layer AS because the chromium film of the first conductive film d1 cannot made so thick because of the increase in the stress as to ride over the stepped shape of the i-type semiconductor layer AS. In short, the second conductive film d2 is made thick to improve the step coverage. The second conductive film d2 can be made thick so that it can highly contribute to the reduction of the resistance of the source electrode SD1 (as well as those of the drain electrode SD2 and the video signal line DL).

The third conductive film d3 is connected with the first conductive film d1, which is exposed to the outside by reducing the size of the second conductive film d2, because it cannot ride over the stepped shape made by the i-type semiconductor layer AS of the second conductive film d2. The first conductive film d1 and the third conductive film d3 can not only have an excellent adherence but also ensure the connections between the source electrode SD1 and the transparent pixel electrode ITO1 because their connected portions have a small step.

Transparent pixel electrodes ITO1

The transparent pixel electrode ITO1 constitutes one of the parts of a pixel electrode of a liquid crystal display portion.

The transparent pixel electrode ITO1 is connected to the source electrode SD1 of the thin film transistor TFT1 and to the source electrode SD1 of the thin film transistor TFT2. If any defect occurs in one of the transistors TFT1 and TFT2, for example, the thin film transistor TFT1 is disconnected from the video signal line DL and the pixel electrode ITO1 by a laser beam, etc. during the manufacturing process. Accordingly, neither dot defect nor line defect occur and moreover, since the defect hardly occurs simultaneously in both of the two thin film transistors TFT1 and TFT2, the probability of the occurrence of the dot defect can be extremely reduced.

Passivation Film PSV1

Over the thin film transistor TFT and the transparent pixel electrode ITO1, there is formed the passivation film PSV1, which is provided mainly for protecting the thin film transistor TFT against humidity or the like. Thus, the passivation film PSV1 to be used is highly transparent and humidity resistant. The passivation film PSV1 is formed of a silicon oxide film or silicon nitride film prepared by, for example, the plasma CVD, to have a thickness of about 8,000 angstroms.

Gate terminal GTM, drain terminal DTM

Figure 5:
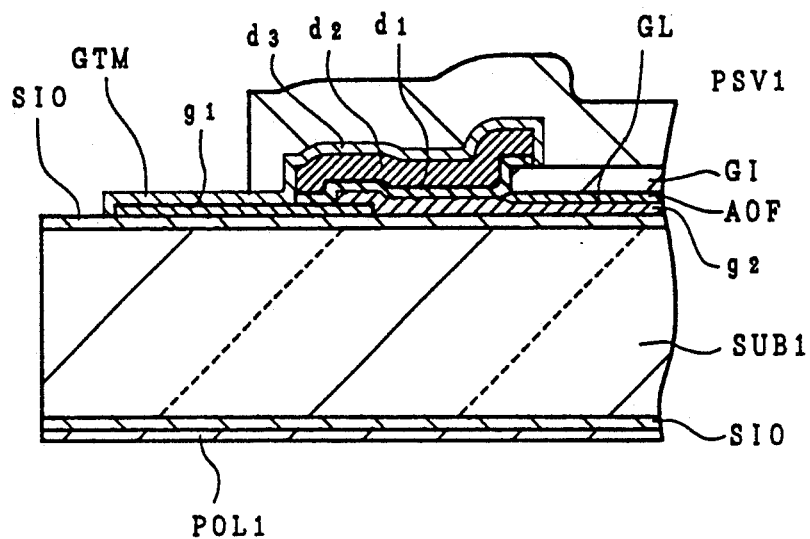
FIG. 5 is a sectional view showing a gate terminal portion of the liquid crystal display device shown in FIG. 2.

The gate terminal GTM is constituted by the first and third conductive layers g1 and d3 as shown in FIG. 5.

Figure 6:
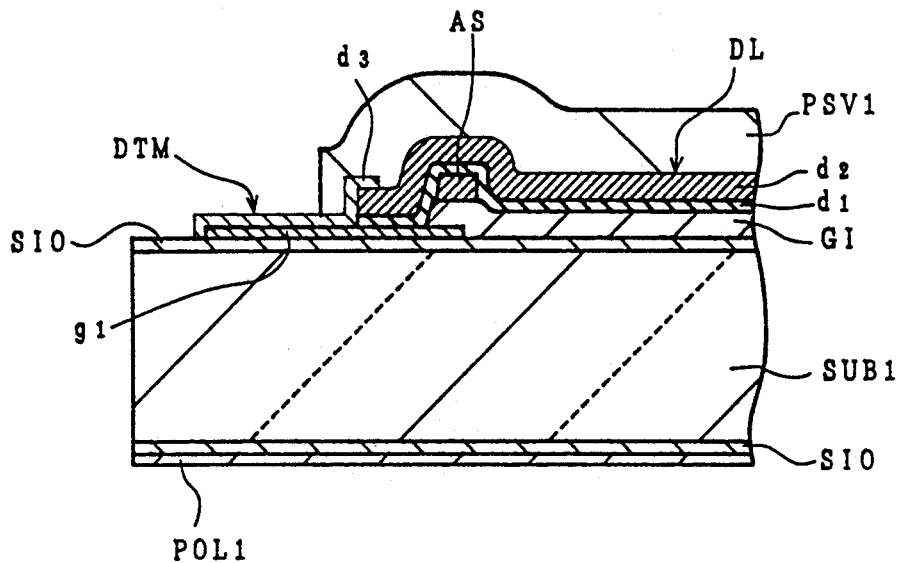
FIG. 6 is a sectional view showing a drain terminal portion of the liquid crystal display device shown in FIG. 2.

The drain terminal DTM is constituted by the first and third conductive layers g1 and d3 as shown in FIG. 6.

The first-level conductive layer g1 is formed by, for example, sputtering chromium (Cr) in the thickness of about 1,000 angstroms.

Shielding Film BM

Figure 10:
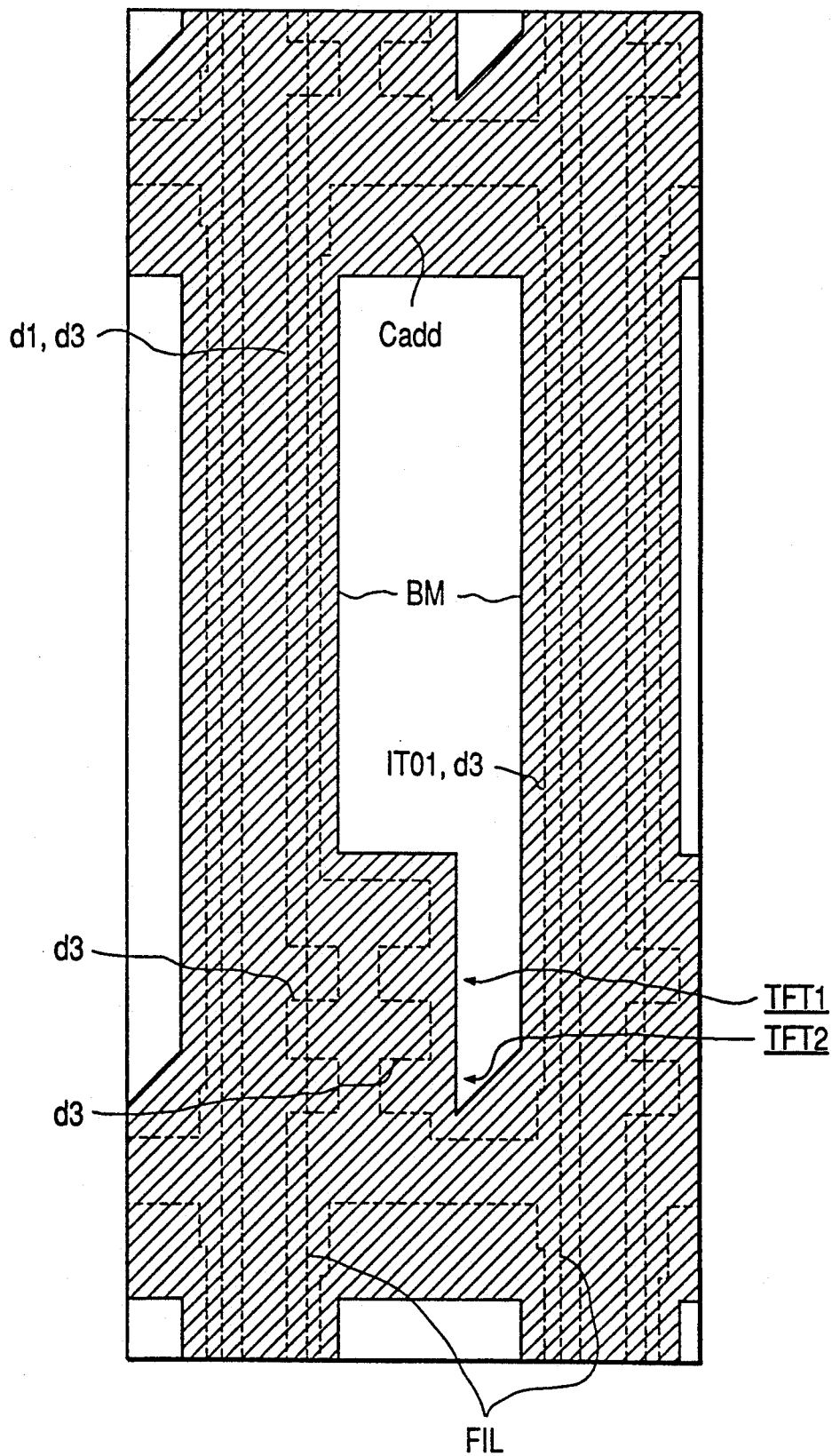
FIG. 10 is a plan view depicting only a predetermined layer of the pixel shown in FIG. 2.

At the side of the upper substrate SUB2, there is disposed the shielding film BM for shielding any external light (i.e., the light coming from the top of FIG. 3) from entering the i-type semiconductor layer AS to be used as the channel forming region, as hatched to have the pattern shown in FIG. 10. Here, FIG. 10 is a top plan view showing only the ITO film, the third conductive layer d3, the color filter FIL and the shielding film BM of FIG. 2. The shielding film BM is formed of a film having a high shielding property to the light, e.g., an aluminum film or chromium film. In the present embodiment, the shielding film BM is formed of a chromium film by the sputtering, to have a thickness of about 1,300 angstroms.

As a result, the common i-type semiconductor layer AS shared by the TFT1 and TFT2 is sandwiched between the upper shielding film BM and the lower but larger gate electrode GT so that it is shielded from the outside natural light or the back light. The shielding film BM is formed around the pixel, as hatched in FIG. 10. Specifically, the shielding film BM is formed in a lattice (of black matrix) shape, which defines the effective display region of one pixel. As a result, the contour of each pixel is clarified to improve the contrast by the shielding film BM. In other words, this shielding film BM has two functions, i.e., the shielding for the semiconductor layer AS and black matrix functions.

Further, since the portion of the transparent pixel electrode ITO1 (at the lower right hand portion in FIG. 2) opposite to the foot of the rubbing direction is shielded from light by the shielding film BM, even if domain is induced at the above portion, the display characteristics is hardly deteriorated because the domain is shaded.

Incidentally, the back light may be attached to the side of SUB2, whereas the SUB1 may be disposed at the observation side (exposed to the outside).

Common Electrode ITO2

The common transparent pixel electrode ITO2 is opposed to the transparent pixel electrode ITO1, which is provided for each pixel at the side of the lower transparent glass substrate SUB1, so that the liquid crystal has its optical state varied in response to the potential difference (or electric field) between each pixel electrode ITO1 and the common pixel electrode ITO2. This common transparent pixel electrode ITO2 is fed with the common voltage Vcom. This common voltage Vcom is at an intermediate potential between a driving voltage Vdmin at the low level and a driving voltage Vdmax at the high level, both of which are applied to the video signal line DL.

Color Filter FIL

Figure 11:
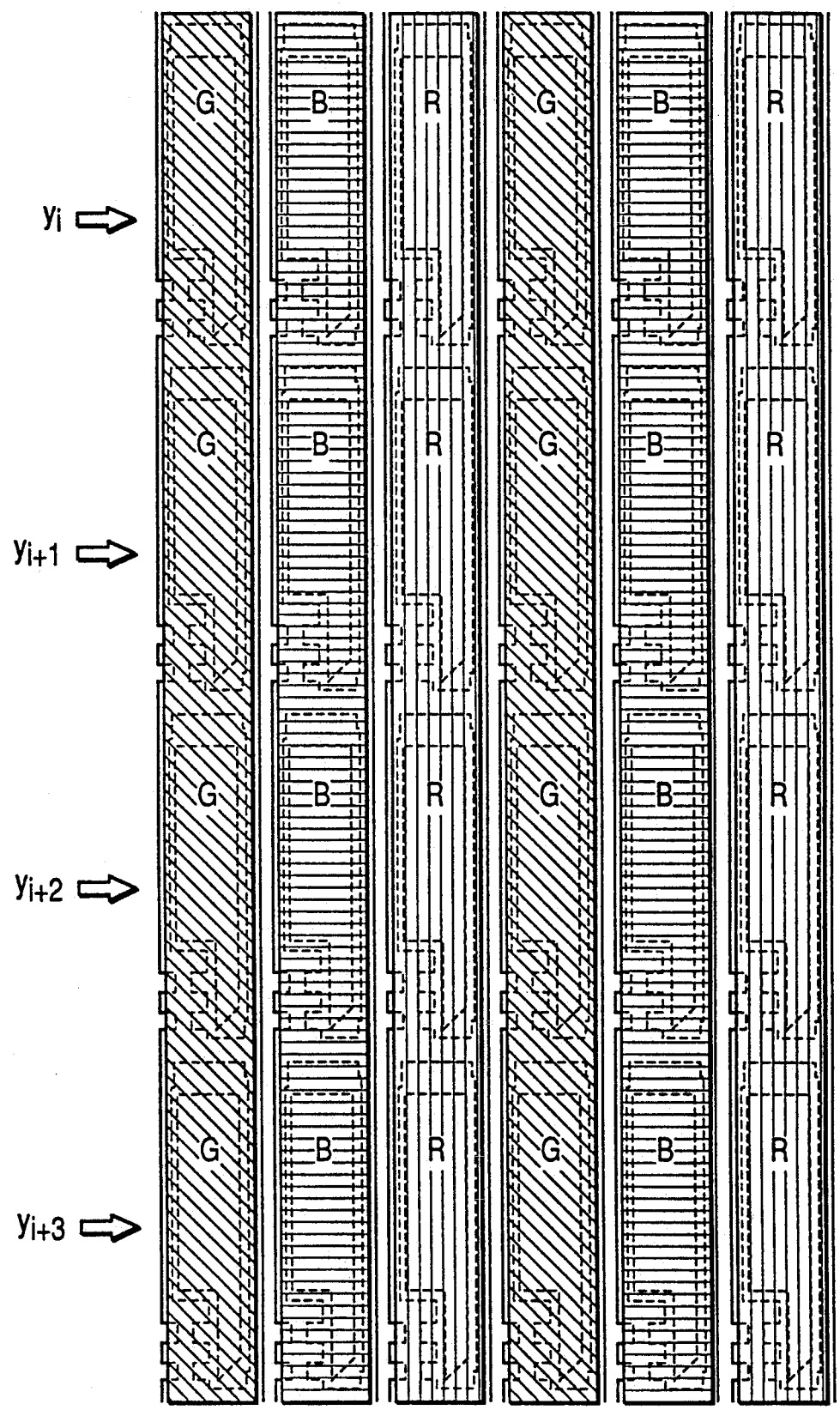
FIG. 11 is a plan view of the principal portions and depicts only the pixel electrode layer, light blocking film and color filter layer shown in FIG. 7.

The color filter FIL is prepared by cooling a dyeing base, which is made of a resin material such as an acrylic resin, with a dye. The color filter FIL is formed (as shown in FIG. 11) in the shape of stripe and in a position to face the pixel (FIG. 11 shows the third conductive film d3, the black matrix layer BM and the color filter layer FIL of FIG. 7 only, and the B, G and R filters FIL are hatched at 45 degrees and 135 degrees and in a cloth, respectively.)

The color filter FIL is made slightly large to cover the pixel electrode ITO1 in its entirety, as shown in FIG. 10. The shielding film BM is so formed inside of the peripheral edge of the pixel electrode ITO1 as to overlap the color filter FIL and the pixel electrode ITO1.

The color filter FIL can be formed in the following manner. First of all, the dyeing base in formed on the surface of the upper transparent glass substrate SUB2, and the dyeing base other than that in the red color filter forming region is removed by the photolithographic technology. After this, the dyeing base is dyed with the red dye and fixed to form the red filter R. Next, the green filter G and blue filter B are sequentially formed by the similar steps.

Passivation Film PSV2

The passivation film PSV2 is provided for preventing the dyes for the different colors of the aforementioned color filter FIL from leaking into the liquid crystal LC. The passivation film PSV2 is made of a transparent resin material such as an acrylic resin or epoxy resin.

Equivalent Circuit of Whole Display Circuit

Figure 12:
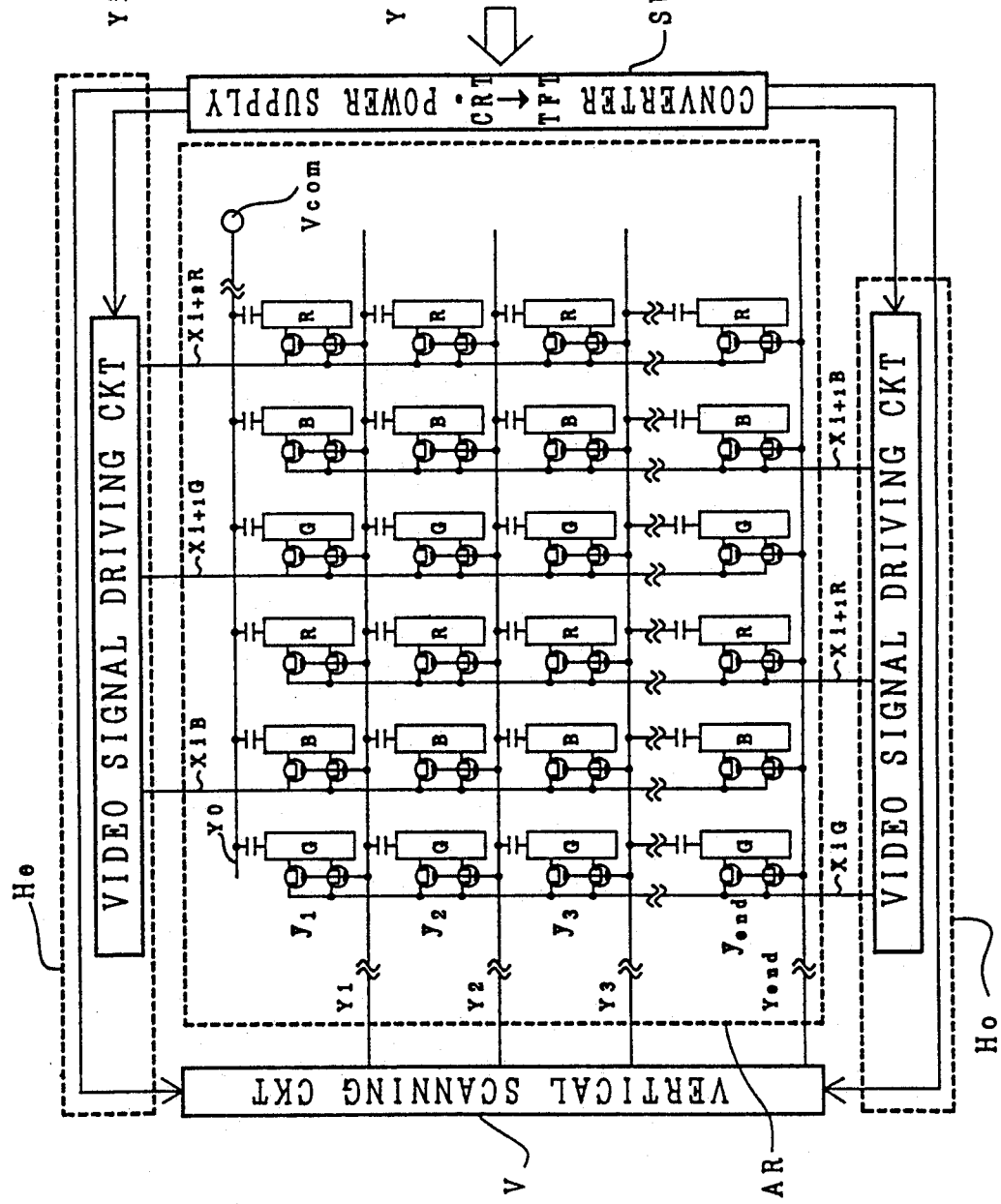
FIG. 12 is an equivalent circuit diagram showing the liquid crystal display portion of the active matrix type color liquid crystal display device.

FIG. 12 shows an equivalent circuit diagram of the display matrix portion and a wiring diagram of its peripheral circuits. Though this drawing is a circuit diagram, it is depicted in such a manner as to correspond to a practical geometric disposition. Symbol AR represents a matrix array formed by disposing two-dimensionally a plurality of pixels.

In the drawing, symbol X represents the video signal line DL, and suffixes G, B and R are corresponding to green, blue and red pixels, respectively. Symbol Y represents the scanning signal line GL and suffixes 1, 2, 3, . . . , end are put in accordance with the sequence of scanning timing.

The video signal line X (whose suffix is omitted) is alternately connected to the upper (or odd-numbered) video signal driving circuit He and to the lower (or even-numbered) video signal driving circuit Ho.

Symbol SUP represents a circuit which includes a power supply circuit for obtaining a plurality of divided and stabilized voltage sources from one voltage source and a circuit for converting data for CRT (cathode-ray tube) from a host (higher order operational processor) to data for the TFT liquid crystal display device.

Structure of Additional Capacitor Cadd

The transparent pixel electrodes ITO1 is formed to overlap the adjoining scanning signal line GL at the end opposite to the end to be connected with the thin film transistor TFT. This superposition constitutes a latching capacity element (or electrostatic capacity element) Cadd which uses the transparent pixel electrode ITO1 as its one electrode PL2 and the adjoining scanning signal line GL as its other electrode PL1, as is apparent from FIG. 4. This latching capacity element Cadd has its dielectric films formed of the same layer as that of the insulating film GI and the anodized oxide film AOF to be used as the gate insulating film of the thin film TFT.

The latching capacitor Cadd is formed in the widened portion of the second-level conductive layer g2 of the gate line GL, as is apparent from FIG. 8. Here, the layer g2 at the portion intersecting the drain line DL is thinned to reduce the probability of the short-circuiting with the drain line.

A portion between the transparent pixel electrode ITO1 and the electrode PL1 to be superposed to constitute the latching capacity Cadd is partially formed like the aforementioned source electrode SD1 with the island region, in which the first conductive film d1 and the second conductive film d2 is formed, so that the transparent pixel electrode ITO1 may not be broken when it rides over the stepped shape. The island region is made as small as possible so that the area (or opening percentage) of the transparent pixel electrode ITO1 may not drop.

Equivalent Circuit of Additional Capacitor Cadd and its Operations

Figure 13:
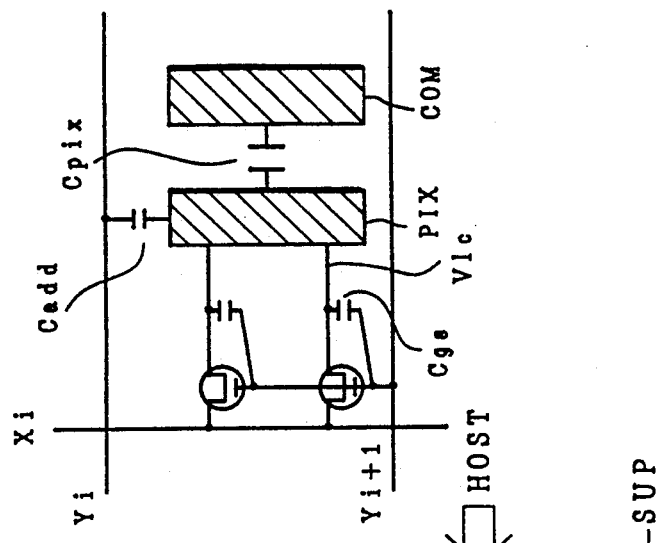
FIG. 13 is an equivalent circuit diagram of the pixel shown in FIG. 2.

The equivalent circuit of the pixel shown in FIG. 2 is shown in FIG. 13. In FIG. 13, letters Cgs designate a parasitic capacitor to be formed between the gate electrode GT and the source electrode SD1 of the thin film transistor TFT. The parasitic capacitor Cgs has its dielectric film made of the insulating film GI. Letters Cpix designate a liquid crystal capacitor to be formed between the transparent pixel electrode ITO1 (or PIX) and the common transparent pixel electrode ITO2 (or COM). The dielectric film of the liquid capacitor Cpix is formed of the liquid crystal LC, the passivation film PSV1 and the alignment films ORI1 and ORI2. Letters Vlc designate a mid point potential.

The aforementioned latching capacity element Cadd functions to reduce the influences of the gate potential variation "delta" Vg upon the center potential (e.g., the pixel electrode potential) Vlc when the TFT switches, as expressed by the following formula:

"delta" $Vlc = \{Cgs/(Cgs + Cadd + Cpix)\} \times$ "delta" $Vg$, wherein "delta" Vlc designates the variation of the central potential due to "delta" Vg.

This variation "delta" Vlc causes the DC component to be added to the liquid crystal and can be reduced the more for the higher latching capacitor Cadd.

Moreover, the latching capacitor Cadd functions to elongate the discharge time and stores the video information for a long time after the TFT is turned off. The DC component to be applied to the liquid crystal LC can improve the lifetime of the liquid crystal LC, if reduced, to reduce the so-called "printing", by which the preceding image is left at the time of switching the liquid crystal display frame.

Since the gate electrode GT is enlarged to such an extent as to cover the i-type semiconductor layer AS completely, as has been described hereinbefore, the overlapped area with the source/drain electrodes SD1 and SD2 is increased to cause an adverse effect that the parasitic capacity Cgs is increased to make the center potential Vlc liable to be influenced by the gate (scanning) signal Vg. However, this demerit can be eliminated by providing the latching capacitor Cadd.

The latching capacity of the aforementioned latching capacity element Cadd is set from the pixel writing characteristics to a level four to eight times as large as that of the liquid crystal capacity Cpix (4Cpix<Cadd<8Cpix) and eight to thirty two times as large as that of the capacity Cgs (8Cgs<Cadd<32Cgs).

Method of Connecting Electrode Line of Additional Capacitor Cadd

The initial stage scanning signal line GL (i.e., Yo) to be used only as the capacity electrode line is connected with the common transparent pixel electrode (Vcom) ITO2, as shown in FIG. 12. The common transparent pixel electrode ITO2 is connected with a leading-out line in the peripheral edge of the liquid crystal display circuit by means of a silver paste SL, as shown in FIG. 3. Moreover, this leading-out line has its partial conductive layer (g1 or g2) prepared at the same step as that of the scanning signal line GL. As a result, the final stage capacity electrode line GL can be easily connected with the common transparent pixel electrode ITO2.

The first stage capacitor electrode line Yo may be connected either the final stage scanning line $Y_{end}$, a D.C. voltage potential (A.C. common potential) other than $V_{com}$ or the vertical scanning circuit V to receive an additional or redundant scanning pulse Yo.

Figure 14:
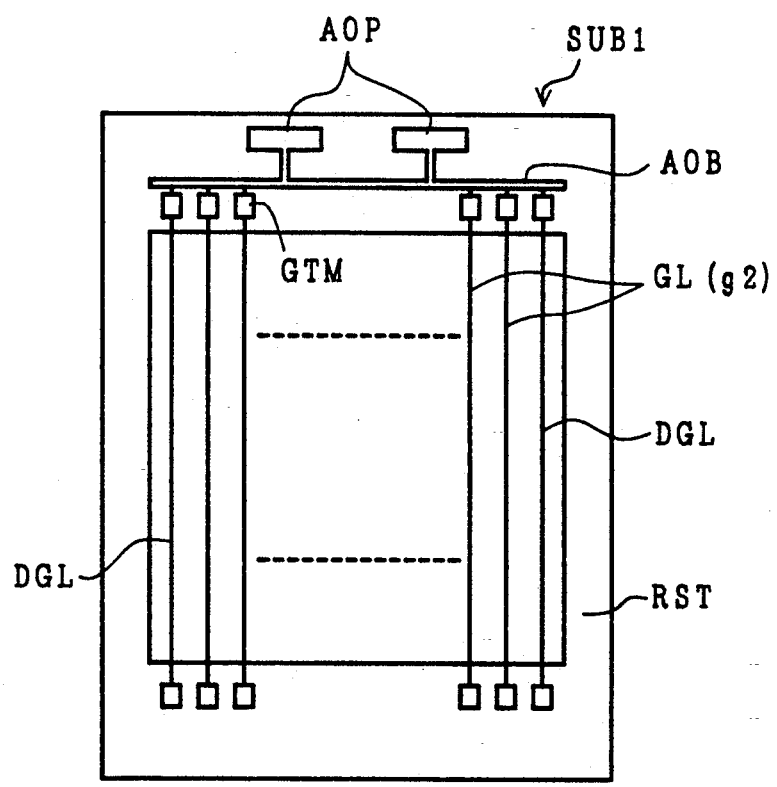
FIG. 14 is an explanatory view of a production method of the liquid crystal display device shown in FIG. 2.

Next, the method of producing the liquid crystal display device according to the present invention will be explained. First of all, a silicon dioxide film SiO2 is disposed on both surfaces of a lower transparent glass substrate SUB1 made of 7059 glass (a trade name) by dip treatment, and baking is then effected at 500° C. for 60 minutes. Next, a first conductor film g1 consisting of a 1,100 angstroms—thick chromium is disposed by sputtering on the lower transparent glass substrate SUB1. The first conductor film g1 is then etched selectively by photolithography using a cerium (II) ammonium nitrate solution as an etching solution so as to form a gate terminal GTM and a drain terminal DTM and at the same time, to form an anodic oxide bus line AOB for connecting the gate terminal GTM and an anodic oxide pad AOP connected to the anodic oxide bus line AOB as shown in FIG. 14. After the resist is removed by a peeling solution S502 (trade name), O2 asher is effected for one minute. Next, a 2,600 angstroms-thick second conductor film g2 made of aluminum-palladium, aluminum-silicon, aluminum-silicon-titanium, aluminum-silicon-copper, etc, is deposited by sputtering. This second conductor film g2 is then etched selectively by photolithography using a mixed acid of phosphoric acid, nitric acid and acetic acid as an etching solution so as to form the scanning signal line GL, the dummy line DGL, the gate electrode GT and the electrode PL1 of the latching capacitance element Cadd. Next, an SF6 gas is introduced into a dry etching apparatus to remove residues such as silicon, and then the resist is removed. Next, a photoresist RST for anodic oxidation is disposed. The portion of the lower transparent glass substrate SUB1, which is to be anodically oxidized, is dipped into an anodic oxidation solution prepared by adjusting a pH of a 3% tartaric acid solution to pH 7.0±0.5 by ammonia and the diluting this solution to 1:9 by an ethylene glycol solution. An anodic oxidation voltage is applied to the anodic oxide pad AOP to anodically oxidize the second conductor film g2 and in this way, the anodic oxide film AOF is formed on the scanning signal line GL, the dummy line DGL and the gate electrode GT. Next, an ammonia gas, a silane gas and a nitrogen gas are introduced into a plasma CVD apparatus to deposite a 3,500 angstroms-thick silicon nitride film, and the silane gas and a hydrogen gas are introduced into the plasma CVD apparatus so as to deposite a 2,100 angstroms-thick i-type amorphous silicon film. Then, hydrogen and phosphine are introduced into the plasma CVD apparatus to deposit a 300 angstroms-thick N(+) type amorphous silicon film. The N(+) type amorphous silicon film and the i-type amorphous silicon film are selectively etched by photolithography using SF$_6$ and CCl$_4$ as a dry etching gas so as to form an i-type semiconductor layer AS. After the resist is removed, the silicon nitride film is selectively etched by photoetching using SF$_6$ as a dry etching gas to form an insulating film GI. After the resist is removed, a 600 angstroms thick first conductor film d1 made of chromium is disposed by sputtering. This first conductor film d1 is selectively etched by photolithography so as to form the video signal line DL, the dummy line DDL, the source electrode SD1 and the first layer of the drain electrode SD2. Before the resist is removed, the N(+) is selectively etched to form an N(+) type semiconductor layer dO. Next, the second conductor film d2 and third conductor film d3 are formed and selectively etched so as to form the video signal line DL, the dummy line DDL, the source electrode SD1, the drain electrode SD2, the gate terminal GTM, the uppermost layer of the drain terminal DTM and the transparent pixel electrode ITO1, which elements are shown in FIGS. 1, 2 and 3. After this, a protective film PSV1 such as shown in FIG. 3 is formed to protect the above-noted elements.

Figure 15:
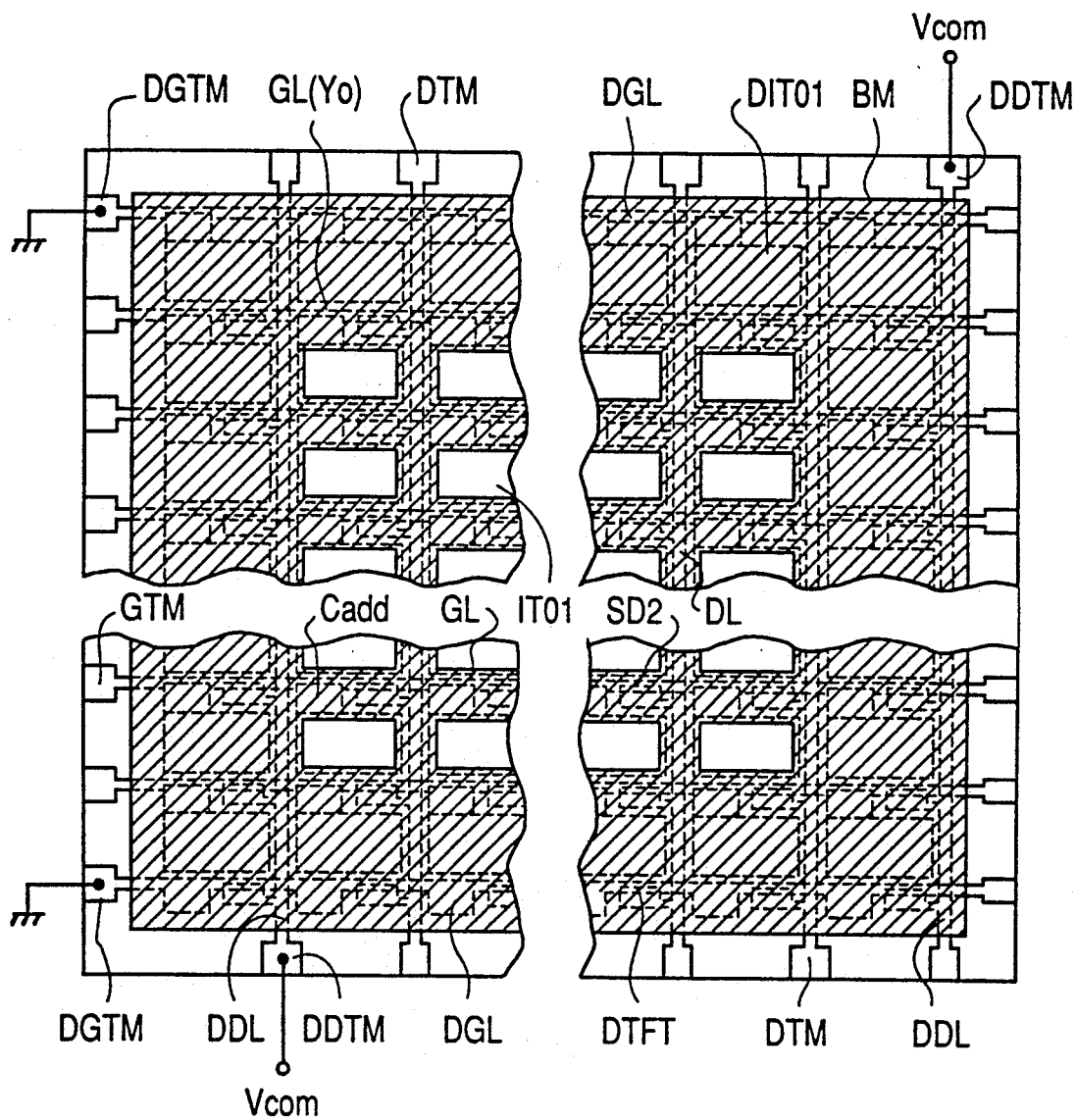
FIG. 15 is a schematic view showing the four corners of the pixel portion of another active matrix type color liquid crystal display device according to the present invention

FIG. 15 is a schematic view showing the four corners of a pixel portion of another active matrix type color liquid crystal display device according to the present invention. In this liquid crystal display device, the potential of the dummy terminal DGTM of the dummy line disposed outside the outermost scanning signal line GL is a ground potential and the dummy terminal DDTM of the dummy line DDL disposed outside the outermost video signal line DL is connected to a common voltage Vcom. A dummy pixel having a dummy transparent pixel electrode DITO, a dummy thin film transistor DTFT, etc., is formed outside the pixel and the gate electrode of the dummy thin film transistor of the dummy pixel and its drain electrode are connected to the scanning signal line GL, the video signal line DL and the dummy lines DGL, DDL. The light blocking layer BM (applied with hatching in FIG. 15) masks the dummy pixel.

In this way, since the potential of the dummy line DGL is the ground potential, the dummy thin film transistor DTFT is not turned ON. Therefore, even when the video signal is applied tot he video signal line DL, no voltage is applied to the liquid crystal LC of the dummy transparent pixel electrode DITO1. Since the dummy line DDL is connected to the common voltage Ccom, no voltage is applied to the liquid crystal LC of the dummy transparent pixel electrode DITO1 portion even when the scanning signal is applied to the scanning signal line GL and the dummy thin film transistor DTFT is turned ON. Since the light blocking film BM masks the dummy pixel, light of the dummy pixel, even when the dummy pixel is lit, if the video signal were applied to the dummy transparent pixel electrode DITO1, that light is blocked by the light blocking film BM.

Though the present invention has been definitely described with the embodiment given above, the present invention is not limited thereto but can, of course, be changed or modified in various ways without departing from the scope thereof.

For example, the embodiment given above illustrates the reverse stagger structure for forming the gate electrode →gate insulating film→semiconductor layer→ source and drain electrodes, but the present invention is effective even in a stagger structure wherein the upper and lower relate is opposite or the sequence of formation is opposite.

In the embodiment described above, one dummy line DGL, DDL is disposed but two or more dummy lines DGL, DDL may be disposed. In the embodiment described above, the case where the anodic oxide film AOF of aluminum is disposed on the scanning signal line has been explained. However, this invention can also be applied to the case where an anodic oxide film of tantalum, titanium, etc, is disposed on the scanning signal line.

As described above, in the liquid crystal display device according to the present invention, the formation condition of the outermost signal line and other signal lines and their etching condition become the same when these signal lines are formed. Accordingly, the outermost signal line is not broken.

When the signal line is the scanning signal line and the anodic oxide film is disposed on the scanning signal line, the electric field in the outermost signal scanning line does not become heterogeneous during anodic oxidation. Since dirt cannot easily adhere to the outermost scanning signal line during the formation of the photoresist, the outermost scanning signal line is not broken.

What is claimed is:

1. A liquid crystal display device comprising:
   a first substrate and a second substrate;
   a liquid crystal layer formed between said first and second substrates;
   a plurality of thin-film transistors formed between said first substrate and said liquid crystal layer, each including a gate electrode, a semiconductor film, a gate insulating film formed between said semiconductor film and said gate electrode and a pair of source/drain electrodes formed apart from each other;
   a plurality of pixel electrodes each electrically connected with one of said pair of source/drain electrodes of an associated one of said transistors;
   a plurality of row conducting lines each electrically connected with gate electrodes of associated transistors;
   a plurality of column conducting lines each electrically connected with the other of said pair of source/drain electrodes of associated transistors; and
   a dummy line disposed outside of an outermost one of said column conducting lines.

2. A liquid crystal display device according to claim 1, wherein another dummy line is disposed outside of an outermost one of said row conducting lines, and an anodic oxide film is disposed on said outermost one of said row conducting lines.

3. A liquid crystal display device according to claim 2, wherein said other dummy line is electrically coupled to ground potential.

4. A liquid crystal display device according to claim 1, wherein a plurality of dummy pixels are disposed outside of an outermost pixel, and said dummy pixels are masked by a light blocking film.

5. A liquid crystal display device according to claim 1, wherein said semiconductor film is an amorphous silicon.

6. A liquid crystal display device according to claim 1, wherein said gate electrode includes aluminum.

7. A liquid crystal display device according to claim 1, wherein said dummy line is electrically coupled to common voltage.

8. A liquid crystal display device comprising:
a first substrate and a second substrate;
a liquid crystal layer formed between said first and second substrates;
a plurality of thin-film transistors formed between said first substrate and said liquid crystal layer, each including a gate electrode, a semiconductor film, a gate insulating film formed between said semiconductor film and said gate electrode and a pair of source/drain electrodes formed apart from each other;
a plurality of pixel electrodes each electrically connected with one of said pair of source/drain electrodes of one of said transistors;
a plurality of row conducting lines each electrically connected with gate electrodes of associated transistors;
a plurality of column conducting lines each electrically connected with the other of said pair of source/drain electrodes of associated transistors;
dummy row conducting lines disposed outside of outermost ones of said row conducting lines; and
dummy column conducting lines disposed outside of outermost ones of said column conducting lines.

9. A liquid crystal display device according to claim 8, wherein said row conducting lines are covered by anodic oxide film.

10. A liquid crystal display device according to claim 8, wherein said semiconductor film is an amorphous silicon.

11. A liquid crystal display device according to claim 8, wherein said gate electrode includes aluminum.

12. A liquid crystal display device according to claim 8, wherein a plurality of dummy pixels are disposed outside of a outermost pixel, and said dummy pixels are masked by a light blocking film.

13. A liquid crystal display device according to claim 8, wherein said dummy row conducting lines are electrically coupled to ground potential.

14. A liquid crystal display device according to claim 8, wherein said dummy column conducting lines are electrically coupled to common voltage.

15. A liquid crystal display device comprising:
a first substrate and a second substrate;
a liquid crystal layer formed between said first and second substrates;
a plurality of thin-film transistors formed between said first substrate and said liquid crystal layer, each including a gate electrode, a semiconductor film, a gate insulating film formed between said semiconductor film and said gate electrode and a pair of source/drain electrodes formed apart from each other;
a plurality of pixel electrodes each electrically connected with one of said pair of source/drain electrodes of one of said transistors;
a plurality of row conducting lines each electrically connected with gate electrodes of associated transistors;
a plurality of column conducting lines each electrically connected with the other of said pair of source/drain electrodes of associated transistors;
a plurality of dummy pixels being disposed outside of outermost pixels, and said dummy pixels are masked by a light blocking film.

16. A liquid crystal display device according to claim 15, wherein said row conducting lines are covered by anodic oxide film.

17. A liquid crystal display device according to claim 15, wherein said semiconductor film is a amorphous silicon.

18. A liquid crystal display device according to claim 15, wherein said gate electrode includes aluminum.

19. A liquid crystal display device according to claim 15, wherein said dummy pixels include dummy row conducting lines disposed each outside of outermost row conducting lines.

20. A liquid crystal display device according to claim 19, wherein said dummy row conducting lines are electrically coupled to ground potential.

21. A liquid crystal display device according to claim 15, wherein said dummy pixels include dummy column conducting lines disposed each outside of outermost column conducting lines.

22. A liquid crystal display device according to claim 21, wherein said dummy column conducting lines are electrically coupled to common voltage.

* * * * *